United States Patent
Ghodrat

(10) Patent No.: US 12,105,646 B2
(45) Date of Patent: Oct. 1, 2024

(54) ADAPTIVE OUT OF ORDER ARBITRATION FOR NUMEROUS VIRTUAL QUEUES

(71) Applicant: ADVANCED MICRO DEVICES, INC., Santa Clara, CA (US)

(72) Inventor: Fataneh Ghodrat, Boxborough, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 191 days.

(21) Appl. No.: 17/539,367

(22) Filed: Dec. 1, 2021

(65) Prior Publication Data

US 2022/0171717 A1    Jun. 2, 2022

Related U.S. Application Data

(60) Provisional application No. 63/120,029, filed on Dec. 1, 2020.

(51) Int. Cl.
*G06F 13/16* (2006.01)
*G06T 1/20* (2006.01)
*G06T 1/60* (2006.01)

(52) U.S. Cl.
CPC .......... *G06F 13/1642* (2013.01); *G06T 1/20* (2013.01); *G06T 1/60* (2013.01)

(58) Field of Classification Search
CPC .......... G06F 13/1642; G06T 1/20; G06T 1/60
See application file for complete search history.

(56) References Cited

U.S. PATENT DOCUMENTS

| | | | |
|---|---|---|---|
| 2001/0023469 A1* | 9/2001 | Jeong | G06F 13/364 710/316 |
| 2009/0164689 A1* | 6/2009 | Luba | G06F 12/0831 710/305 |
| 2014/0229645 A1* | 8/2014 | Gabbay | G06F 13/364 710/113 |
| 2016/0188499 A1* | 6/2016 | Nagarajan | G06F 13/1663 711/150 |
| 2018/0165790 A1* | 6/2018 | Schneider | G06F 12/0815 |
| 2020/0112525 A1* | 4/2020 | Donley | H04L 49/90 |

* cited by examiner

*Primary Examiner* — Nimesh G Patel

(57) ABSTRACT

A system includes a memory implementing one or more virtual queues and a processor coupled to the memory. In response to issuing one or more requests for data, a processor maps one or more of the requests for data to a return queue structure. The processor then allocates one or more virtual queues to the return queue structure based on the mapped requests. In response to allocating the virtual queues to the return queue, the processor writes the data indicated in the mapped requests to the allotted virtual queues and enables the return queue for arbitration. When the return queue is enabled for arbitration, the processor reads out the data written to the allocated virtual queues, processes the read out data, and provides the processed data to a processing pipeline.

16 Claims, 8 Drawing Sheets

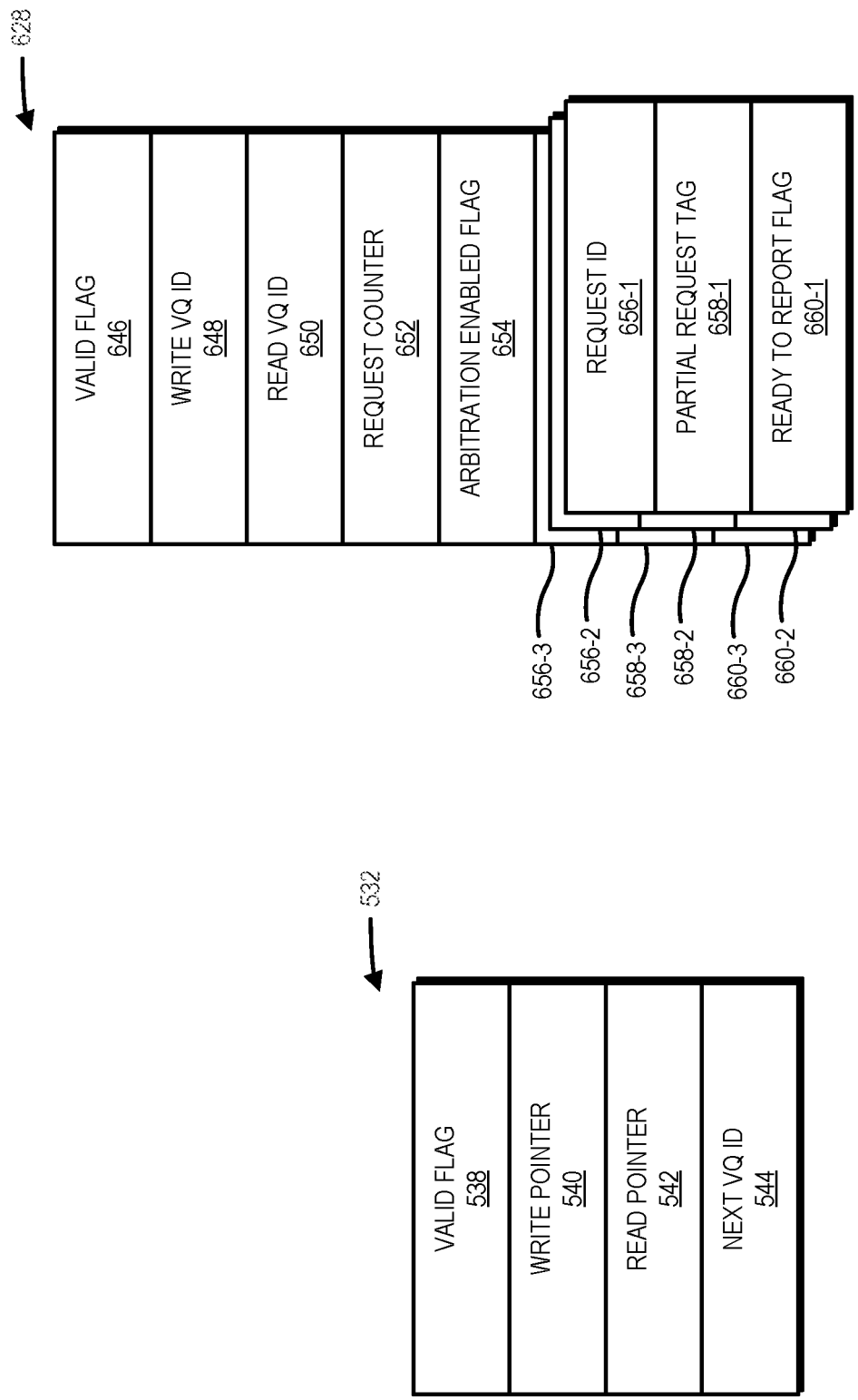

ADAPTIVE OUT OF ORDER ARBITRATION FOR NUMEROUS VIRTUAL QUEUES

BACKGROUND

Within graphics processing systems, graphics pipelines are used to support the rendering of graphical objects. Such graphics pipelines include multiple operations that are performed by one or more processors within the processing system. To perform these operations, the processors request numerous data and instructions from a memory that are used to support these operations. As the processing system fulfills these requests, the requested data and instructions are processed and used in the operations of the graphics pipeline. However, processing the requests in the order in which they are generated or received by the processing system can lead to bottlenecks as requests must wait to be processed. Such bottlenecks reduce the processing times and processing efficiency of the processing system.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

FIG. 5 is a block diagram of an example implementation of a virtual queue structure, in accordance with an example embodiment.

FIG. 6 is a block diagram of an example implementation of a return queue structure, in accordance with an example embodiment.

DETAILED DESCRIPTION

Techniques and systems described herein address reducing processing times of requests for data. To reduce these processing times, a processor maps one or more requests for data to a return queue structure. The processor then allocates one or more virtual queues each representing a portion of a memory to the return queue structure based on the request. After the virtual queues are allocated to the return queue structure, the processor writes the data indicated in the request to the allotted virtual queues. In response to all the data indicated in the requests being written to the allotted virtual queues, the return queue is enabled for arbitration. Once the return queue is enabled for arbitration, the data written to the allocated virtual queues is read out, processed, and provided to a processing pipeline. In this way, the processor is configured to arbitrate return queues, and thus the requests mapped to those return queues, out of order. As such, processing times of the processor are reduced as the return queues are arbitrated as they are ready and do not need to wait for arbitration of a first return queue to be completed before they are arbitrated.

When data indicated in a request mapped to the return queue is too large to be retrieved at once from a memory, the processor breaks that request into one or more partial requests. To prevent such partial requests from causing deadlocks when they are arbitrated, return queues that include partial requests are arbitrated after any return queues not including a partial request. In other words, the processor defers arbitration of return queues including partial requests until the return queues not including partial requests have been arbitrated. Deferring the arbitration of the return requests with partial requests in this way helps guarantee that the return queues not containing partial requests will be able to allocate the lines they need to complete arbitration.

Figure 1:
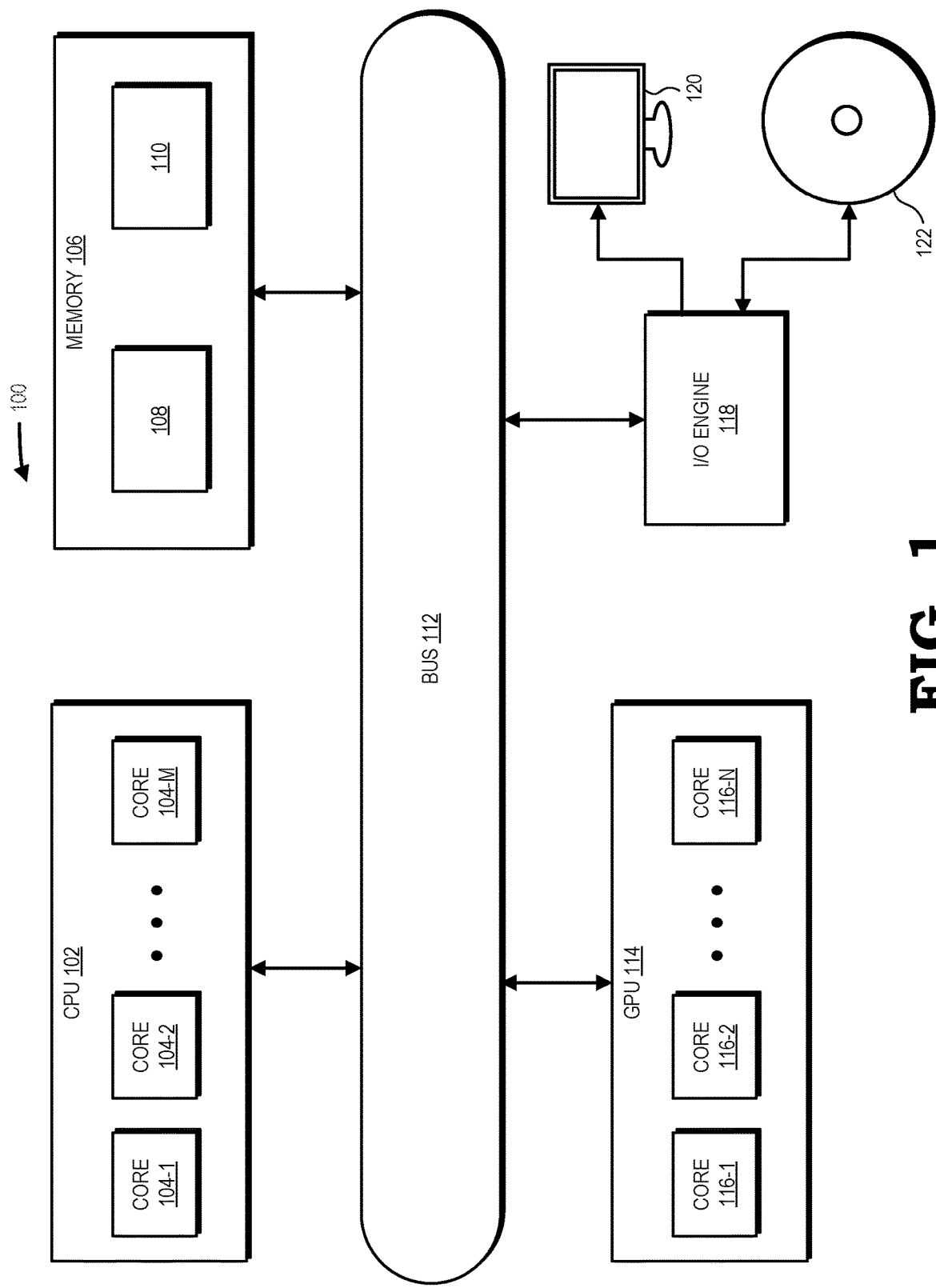
FIG. 1 is a block diagram of a processing system configured for out-of-order processing of requests, in accordance with some embodiments.

FIG. 1 is a block diagram of a processing system 100 configured for out-of-order processing of requests, according to some embodiments. The processing system 100 includes, or has access to, a memory 106 or other storage component implemented using a non-transitory computer-readable medium, for example, a dynamic random-access memory (DRAM). However, in embodiments, the memory 106 is implemented using other types of memory including, for example, static random-access memory (SRAM), non-volatile RAM, and the like. According to embodiments, the memory 106 includes an external memory implemented external to the processing units implemented in the processing system 100. The processing system 100 also includes a bus 112 to support communication between entities implemented in the processing system 100, such as the memory 106. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly parallel processors, artificial intelligence (AI) processors, inference engines, machine learning processors, other multithreaded processing units, and the like), scalar processors, serial processors, or any combination thereof. FIG. 1 illustrates an example of a parallel processor and in particular a graphics processing unit (GPU) 114, in accordance with some embodiments. The GPU 114 renders images for presentation on a display 120. For example, the GPU 114 renders objects to produce values of pixels that are provided to the display 120, which uses the pixel values to display an image that represents the rendered objects. The GPU 114 implements a plurality of processor cores 116-1 to 116-N that execute instructions concurrently or in parallel. According to embodiments, one or more processor cores 116 operate as single instruction, multiple data (SIMD) units that perform the same operation on different data sets. Though in the example embodiment illustrated in FIG. 1, three cores (116-1, 116-2, 116-N) are presented representing an N number of cores, the number of processor cores 116 implemented in the GPU 114 is a matter of design choice. As such, in other embodiments, the GPU 114 can include any number of cores 116. Some embodiments of the GPU 114 are used for general-purpose computing. The GPU 114 executes instructions such as program code 108 stored in the memory 106 and the GPU 114 stores information in the memory 106 such as the results of the executed instructions.

The processing system 100 also includes a central processing unit (CPU) 102 that is connected to the bus 112 and therefore communicates with the GPU 114 and the memory 106 via the bus 112. The CPU 102 implements a plurality of processor cores 104-1 to 104-N that execute instructions concurrently or in parallel. In embodiments, one or more of the processor cores 104 operate as SIMD units that perform the same operation on different data sets. Though in the example embodiment illustrated in FIG. 1, three cores (104-1, 104-2, 104-M) are presented representing an M number of cores, the number of processor cores 104 implemented in the CPU 102 is a matter of design choice. As such, in other embodiments, the CPU 102 can include any number of cores 104. In some embodiments, the CPU 102 and GPU 114 have an equal number of cores 104, 116 while in other embodiments, the CPU 102 and GPU 114 have a different number of cores 104, 116. The processor cores 104 execute instructions such as program code 110 stored in the memory 106 and the CPU 102 stores information in the memory 106 such as the results of the executed instructions. The CPU 102 is also able to initiate graphics processing by issuing draw calls to the GPU 114. In embodiments, the CPU 102 implements multiple processor cores (not shown in FIG. 1 in the interest of clarity) that execute instructions concurrently or in parallel.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the GPU 114, or the CPU 102. In the illustrated embodiment, the I/O engine 118 reads information stored on an external storage component 122, which is implemented using a non-transitory computer-readable medium such as a compact disk (CD), a digital versatile disc (DVD), and the like. The I/O engine 118 is also able to write information to the external storage component 122, such as the results of processing by the GPU 114 or the CPU 102.

In embodiments, CPU 102, GPU 114, or both, perform one or more graphics operations using cores 104 and cores 116, respectively. For example, CPU 102, GPU 114, or both perform one or more operations for one or more graphics pipelines to render one or more graphical objects. Such graphics pipelines include, for example, one or more shader operations (e.g., hull shader operations, geometry shader operations, pixel shading operations), raytracing operations, geometry operations, blending operations, lighting operations, rasterization operations, or any combination thereof, to name a few. As an example, CPU 102, GPU 114, or both perform one or more shader operations for a graphics pipeline. To perform one or more operations for a graphics pipeline, CPU 102, GPU 114, or both are configured to issue one or more requests that request data, instructions, or both from the memory 106 necessary for, aiding in, or helpful in performing the operations for the graphics pipeline. For example, to perform one or more shader operations for a graphics pipeline, CPU 102, GPU 114, or both issue requests for data from one or more cachelines necessary for, aiding in, or helpful in performing the shader operations from memory 106. According to embodiments, one or more requests issued from CPU 102, GPU 114, or both include one or more sets of requests configured to return together (e.g., concurrently). In some embodiments, one or more of the requests include one or more vectors. According to embodiments, CPU 102, GPU 114, or both issue one or more sets of requests over one or more cycles. In embodiments, one or more requests, sets of requests, or both issued by CPU 102, GPU 114, or both are too large to be retrieved at once from memory 106. For example, a request indicating data from a number of cachelines greater than the number of ways of the memory 106. One or both of CPU 102 and GPU 114 are configured to break up such requests into one or more partial requests with each partial request including at least a portion of the request. For example, a request requesting data in 32 cachelines from a 16-way associative memory is broken up into two partial requests requesting data in 16 cachelines each.

To facilitate the return of requests and partial requests, CPU 102, GPU 114, or both, virtualizes memory 106 into one or more virtual queues, for example first in, first out (FIFO) queues. That is to say, CPU 102, GPU 114, or both, implement one or more virtual queues in memory 106 such that each virtual queue represents at least a portion of memory 106. Such virtual queues include data structures configured to track data necessary for, aiding in, or helping in fulling one or more requests issued from CPU 102, GPU 114, or both. For example, a virtual queue includes a structured array that includes one or more entries configured to store requested data, requested instructions, write pointers, read pointers, or any combination thereof. In embodiments, one or more virtual queues are fixed to addresses to save in pointer storage.

In response to receiving one or more requests, partial requests, or both, CPU 102, GPU 114, or both map one or more issued requests, partial requests, or both to a return queue. A return queue includes one or more data structures configured to store data necessary for, aiding in, or helpful in the arbitration of the requests and partial requests mapped to the return queue. For example, a return queue includes virtual queue data (e.g., identification information of virtual queues) and arbitration information that includes, for example, request counters, arbitration tags (e.g., ready to report tags, arbitration enabled tags, latency), partial request tags, or any combination thereof. For one or more return queues, CPU 102, GPU 114, or both are configured to allocate one or more virtual queues to the return queue based on the requests, partial requests, or both mapped to the return queue. For example, CPU 102, GPU 114, or both allocate a number of virtual queues to the return queue necessary for the retrieval of data indicated in a request mapped to the return queue that is in a number of cachelines. For example, CPU 102, GPU 114, or both allocate a number of virtual queues necessary to write instructions, tags, addresses, or any combination thereof related to the requested data of the cachelines. In response to allocating two or more virtual queues to a return queue, CPU 102, GPU 114, or both store identification data (e.g., unique identifiers, pointers, addresses) of one or more allocated virtual queues in one or more other allocated virtual queues so that the allocated virtual queues are linked. For example, a unique identifier of a first allocated virtual queue is stored in a second allocated virtual queue, a unique identifier of the second allocated virtual queue is stored in a third allocated virtual queue, a unique identifier of the third allocated virtual queue is stored in a fourth allocated virtual queue, and so on. Once one or more virtual queues are allocated to a return queue, CPU 102, GPU 114, or both update the return queue to reflect the virtual queues allocated to the return queue. For example, CPU 102, GPU 114, or both update the return queue with the identification information (e.g., unique identifiers, pointers) of the virtual queues allocated to the return queue.

After one or more virtual queues are allocated to the return queue, CPU 102, GPU 114, or both fetch data, instructions, or both related to the data indicated in the requests and partial requests associated with the return queue using the allocated virtual queues. For example, CPU 102, GPU 114, or both are configured to write one or more instructions, tags, addresses, or any combination thereof related to the cachelines having data indicated in a set of requests mapped to a return queue into one or more entries of the allocated virtual queues. In response to writing data, instructions, or both to the allocated virtual queues, CPU 102, GPU 114, or both update the allocated virtual queues to reflect the writing of the requested data, instructions, or both. For example, CPU 102, GPU 114, or both, update the write pointers of one or more allocated virtual queues. Also, in response to writing the requested data, instructions, or both to the allocated virtual queues, CPU 102, GPU 114, or both update the return queue to reflect the writing of the requested data, instructions, or both. For example, CPU 102, GPU 114, or both update one or more arbitration tags (e.g., ready to report tags) of the return queue. Similarly, in response to an entry being read out of a virtual queue (e.g., during arbitration), CPU 102, GPU 114, or both update the virtual queue to reflect the entry being read out of the virtual queue. For example, CPU 102, GPU 114, or both update a read pointer in a virtual queue based on an entry being read out of the virtual queue. In response to an allocated virtual queue reporting as empty (e.g., a read pointer and write pointer of the virtual queue indicate no data is stored in any entry of the virtual queue), CPU 102, GPU 114, or both release the allocated virtual queue so it is allocatable to one or more other return queues.

In response to one or more requests, partial requests, or both mapped to a return queue being ready to report, CPU 102, GPU 114, or both enable the return queue for arbitration. That is to say, in response to the data, instructions, or both indicated in one or more requests, partial requests, or both being written into one or more virtual queues allocated to the return queue, CPU 102, GPU 114, or both enable the return queue for arbitration. For example, in response to one or more requests, partial requests, or both being ready to report, CPU 102, GPU 114, or both update one or more tags of the return to indicate that the return queue is enabled for arbitration. To arbitrate a return queue, CPU 102, GPU 114, or both reads out the data, instructions, or both of a request or partial request from the allocated virtual queues. The CPU 102, GPU 114, or both then processes the read out data, instructions, or both and provides the processed data to the graphics pipeline. For example, CPU 102, GPU 114, or both arbitrate a return queue such that the data, instructions, or both indicated in a set of requests mapped to the return queue is read out of the virtual queues allocated to the return queue and reduced to a final result that is provided to a shader. In response to determining two or more return queues are concurrently enabled for arbitration, CPU 102, GPU 114, or both perform, for example, round robin arbitration, weighted round robin arbitration, or both on the return queues. In this way, CPU 102, GPU 114, or both are configured to arbitrate return queues, and thus the requests mapped to the return queues, out of order. That is to say, CPU 102, GPU 114, or both arbitrate return queues as requests are ready to report rather than in the order in which the requests were issued. As such, processing times are reduced as CPU 102, GPU 114, or both do not need to wait for a first return queue to be arbitrated before arbitrating a second. To prevent return queues including partial requests from causing deadlocks, return queues including partial requests are arbitrated after the return queues not including a partial request. That is to say, CPU 102, GPU 114, or both defer arbitration of return queues including partial requests until after return queues without partial requests have been arbitrated. Deferring arbitration of the return requests with partial requests in this way helps guarantee that the return queues not containing partial requests will be able to allocate the lines they need to complete arbitration, helping to prevent deadlocks.

Figure 2:
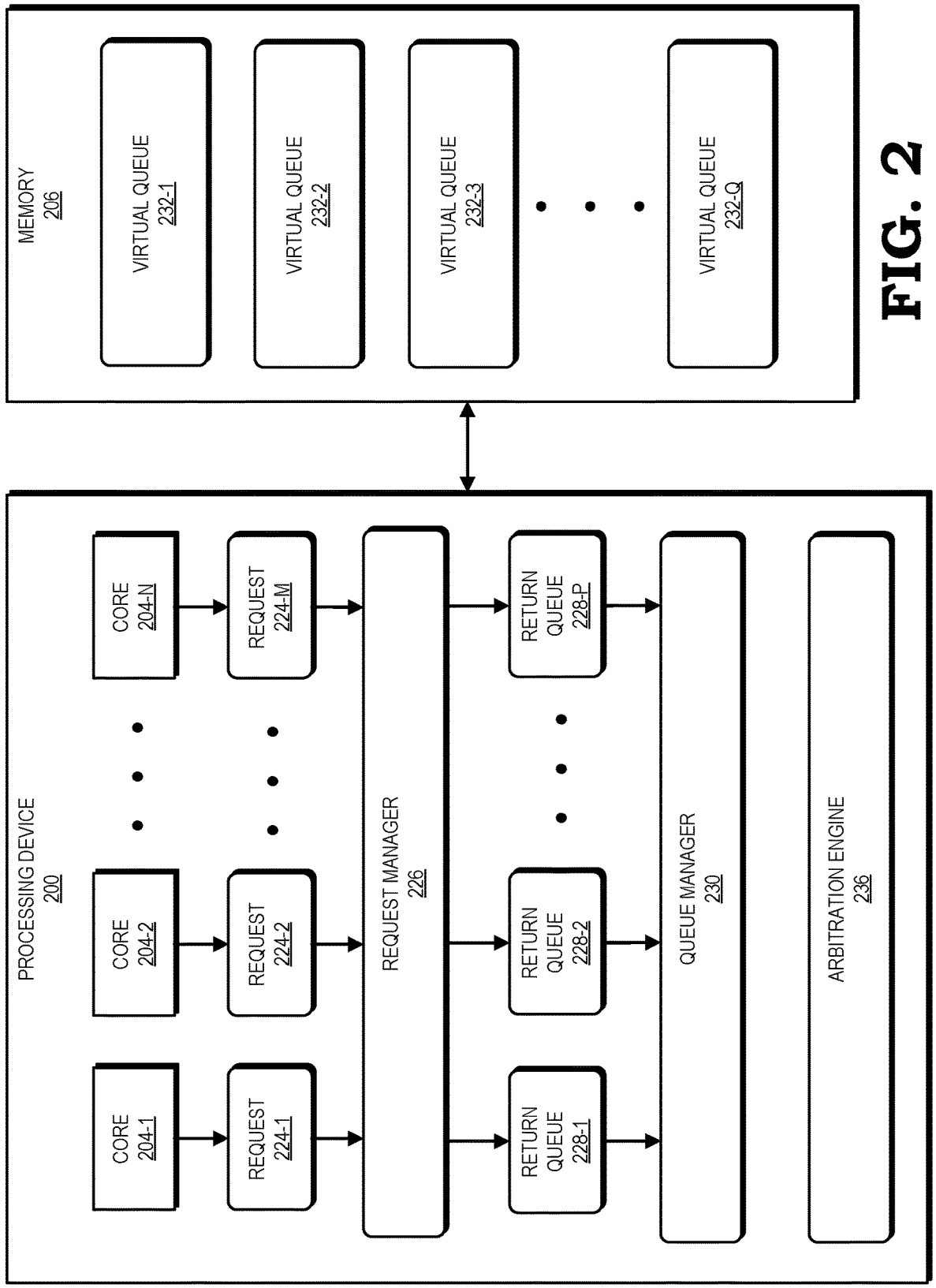
FIG. 2 is a block diagram of a processing device configured for out-of-order processing of requests, in accordance with some embodiments.

Referring now to FIG. 2, a block diagram of a processing device 200 configured for out-of-order processing of return queues is presented. In embodiments, the processing device 200 implements aspects of processing system 100 as described in FIG. 1. For example, processing device 200 may be similar or the same as CPU 102, GPU 114, or both as described in FIG. 1. In embodiments, processing device 200 includes one or more cores 204, similar to or the same as cores 104, 116, configured to perform one or more operations for a graphics pipeline. Such operations include, for example, shader operations (e.g., hull shader operations, geometry shader operations, pixel shading operations), ray-tracing operations, geometry operations, blending operations, lighting operations, rasterization operations, or any combination thereof, to name a few. Though the example embodiment illustrated in FIG. 2 presents three cores (204-1, 204-2, 204-N) representing an N number of cores, in other embodiments, processing device 200 can include any number of cores. In embodiments, one or more cores 204 are configured to issue one or more requests 224 for the operations to be performed by the cores 204. Each request 224 includes one or more requests, sets of requests (e.g., a set of requests configured to return together), or both requesting data, instructions, or both necessary for, aiding in, or helpful in performing the operations. For example, a request 224 includes a request for data necessary for the performance of an operation running on a core 204 that is in one or more cachelines. In some embodiments, one or more requests 224 include one or more vectors. While the example embodiment illustrated in FIG. 2 presents cores 204 issuing three requests (224-1, 224-2, 224-M) representing an M number of requests, in other embodiments, cores 204 can issue any number of requests with each core 204 issuing any number of the requests. According to some embodiments, one or more requests 224 indicate data, instructions, or both that are too large to be retrieved at once from memory 206. For example, a request 224 indicating data that is in a number of cachelines greater than the number of ways of the memory 206. In response to one or more requests 224 requesting (i.e., indicating) data, instructions, or both that are too large to be retrieved at once from memory 206, request manager 226 is configured to break up such requests 224 into one or more partial requests with each partial request including at least a portion of the request 224. For example, a request 224 requesting data in 32 cachelines from a 16-way associative memory is broken up into two partial requests requesting data in 16 cachelines each.

To facilitate the requests 224, processing device 200 includes request manager 226 that includes hardware and software configured to map one or more requests 224 to one or more return queues 228. In embodiments, one or more requests 224 issued by one or more cores 204 are provided to request manager 226. In response to receiving one or more requests 224, request manager 226 is configured to map the requests 224 to one or more respective return queues 228. According to embodiments, each return queue 228 includes a data structure configured to store two categories of data. A first category of data stored in a return queue 228 includes, for example, data relating to one or more virtual queues 232 allocated to the return queue (e.g., virtual queue identification data) and a second category of data stored in a return queue 228 includes, for example, data necessary for, aiding in, or helpful in arbitrating the return queue, for example, request counters, partial request tags, latency data, arbitration tags, validity tags, or any combination thereof. In embodiments, request manager 226 is configured to generate one or more request queues in response to processing device 200 powering on, a delay after processing device 200 powering on, receiving a request 224, or any combination thereof. Though the example embodiment illustrated in FIG. 2 presents three return queues representing a P number of return queues, in other embodiments, processing device 200 includes any number of return queues.

In embodiments, request manager 226 provides one or more mapped return queues 228 to queue manager 230. Queue manager 230 includes hardware and software configured to allocate one or more virtual queues 232 to one or more mapped return queues 228. Each virtual queue represents a virtualized portion of memory 206, similar to or the same as memory 106. That is say, memory 206 implements one or more virtual queues 232 each representing at least a portion of memory 206. The portions of memory 206 represented by a virtual queue 232 each include a number of entries (e.g., blocks) of memory 206. In some embodiments, virtual queues 232 each represent portions having an equal number of entries while in other embodiments one or more virtual queues 232 represent portions having differing numbers of entries. As an example, each virtual queue 232 represents eight respective entries of memory 206. Though the example embodiment illustrated in FIG. 2 presents memory 206 implementing four virtual queues (232-1, 232-2, 232-3, 232-Q) representing a Q number of virtual queues, in other embodiments, memory 206 can implement any number of virtual queues 232. According to embodiments, each virtual queue 232 includes a data structure configured to store one or more tags, identification information, and pointers as well as data, instructions, or both indicated by one or more requests 224. Such tags include, for example, one or more tags indicating whether a virtual queue 232 is valid. For example, a tag indicates a virtual queue 232 is valid when it has been allocated by queue manager 230. Such identification information includes, for example, data identifying the virtual queue (e.g., unique identifier, pointer, address) and data identifying one or more other virtual queues (e.g., unique identifiers, pointers, addresses) linked to the virtual queue 232. In embodiments, identification information includes a size of a virtual queue (e.g., a number of entries of the virtual queue). Such pointers include, for example, a write pointer, a read pointer, or both.

In response to receiving one or more mapped return queues 228, queue manager 230 is configured to allocate one or more virtual queues 232 to the return queues 228. In embodiments, to allocate the virtual queues 232, queue manager 230 determines a number of virtual queues 232 needed to fulfill one or more requests mapped to a return queue 228. That is to say, a number of virtual queues 232 necessary to retrieve the data, instructions, or both indicated in the requests 224. After determining the number of virtual queues 232 needed, queue manager 230 determines the number of virtual queues 232 already allocated to the return queue 228. In response to a difference between the number of virtual queues 232 needed and the number already allocated to the return queue 228, queue manager 230 allocates one or more virtual queues 232 to the return queue 228. For example, queue manager 230 allocates a number of virtual queues 232 to the return queue 228 equal to the difference between the number of virtual queues 232 needed and the number already allocated to the return queue 228. In response to allocating one or more virtual queues 232 to a return queue 228, queue manager 230 is configured to update the allocated virtual queues to reflect the allocation. For example, queue manager 230 updates a validity tag to indicate a virtual queue 232 is valid. If two or more virtual queues 232 are allocated to the same return queue 228, queue manager 230 is configured to update the virtual queues 232 to link them to one another. To link two or more virtual queues together, queue manager 230 stores identification information (e.g., a unique identifier, pointer, address) of one or more virtual queues 232 into one or more other virtual queues 232. For example, to link virtual queues 232-1, 232-2, and 232-3, queue manager 230 stores identification information (e.g., a unique identifier, pointer, address) of virtual queue 232-2 in virtual queue 232-1 and identification information of virtual queue 232-2 in virtual 232-3.

In embodiments, queue manager 230 allocates one or more of the requests 224 mapped to a return queue 228 to one or more virtual queues 232 allocated to the return queue 228. That is to say, queue manager 230 designates one or more virtual queues 232 allocated to a return queue 228 to retrieve the data, instructions, or both indicated in one or more requests 224 mapped to the return queue 228. Queue manager 230 is configured to retrieve the data, instructions, or both indicated in the requests 224 and write the data, instructions, or both to the allocated virtual queues 232. For example, queue manager 230 retrieves instructions, tags, instructions of any combination thereof related to data in cachelines indicated in the requests 224 mapped to a return queue 228 related to a cache included in or otherwise connected to processing device 200 (not shown for clarity) and writes the instructions, tags, instructions of any combination thereof to allocated virtual queues 232. As the data, instructions, or both are written into the virtual queues 232, queue manager 230 is configured to update the virtual queues to reflect the data, instructions, or both being written to the virtual queues 232. For example, queue manager 230 updates a write pointer of a virtual queue 232 that has data written to it. Additionally, queue manager 230 is configured to update the return queue 228 associated with the virtual queues 232 to reflect the data being written to the virtual queues 232. For example, queue manager 230 updates the identification information of the allocated virtual queues 232 stored in the return queue 228. As an example, queue manager 230 updates the virtual queue identification information to indicate the virtual queues currently writing data. Once all the data, instructions, or both indicated in a request 224 mapped to a return queue are written to one or more virtual queues 232 allocated to the return queue 228, queue manager 230 is configured to update the return queue to reflect that one or more requests 224 are ready to report. For example, in response to all the instructions, tags, and addresses related to the cachelines indicated in one or more requests 224 mapped to a return queue 228 (e.g., cachelines storing the requests data) being written into one or more virtual queues 232 allocated to the return queue 228, queue manager 230 updates tags related to the requests 224 to indicate they are ready to return.

According to embodiments, in response to a return queue 228 indicating one or more requests 224, partial requests, or both, are ready to return, queue manager 230 is configured to determine if one or more of the ready to return requests of the return queue 228 is valid. For example, queue manager 230 determines if the data, instructions, or both written into the allocated virtual queues 232 associated with a request 224 are valid. In response to the data, instructions, or both written into the allocated virtual queues 232 associated with a request 224 being valid, queue manager 230 updates a tag of the return queue 228 to indicate that the return queue is enabled for arbitration. According to embodiments, queue manager 230 provides one or more return queues 228 enabled for arbitration to arbitration engine 236.

Arbitration engine 236 includes hardware and software configured to arbitrate one or more requests 224 mapped to one or more return queues 228 enabled for arbitration. To facilitate arbitration of the return queues 228, arbitration engine 236 first determines a number of return queues 228 enabled for arbitration. Within the number of return queues 228 enabled for arbitration, arbitration engine 236 determines if one or more of the return queues 228 includes one or more partial requests that are ready to report. In response to determining that a return queue 228 includes one or more partial requests ready to report, arbitration engine 236 defers arbitration of that return queue 228 until return queues 228 not including a partial request read to report are arbitrated. As an example, arbitration engine 236 determines that return queues 228-1, 228-2, and 228-P are enabled for arbitration and that return queue 228-2 includes a partial request that is ready to report. In response, arbitration engine 236 defers arbitration of return queue 228-2 until after return queues 228-1 and 228-P are arbitrated. For the non-deferred return queues 228 (e.g., the return queues 228 not reporting a partial request that is ready to return), arbitration engine 236 is configured to perform a round robin arbitration, a weighted round robin arbitration, or both on the return queues 228. Once the non-deferred return queues 228 have finished arbitration (e.g., have no more requests 224 ready to report), the return queues 228 including partial requests are then arbitrated. Arbitration includes, for example, reading out data, instructions, or both related to one or more requests 224 that are ready to report from one or more virtual queues 232 allocated to the return queue 228. For example, arbitration includes reading out the data, instructions, or both related to one or more requests 224 from the allocated virtual queues 232 into one or more memories, queues, analog logics, digital logics, or any combination thereof configured to process to the data, instructions, or both. In embodiments, arbitration further includes, for example, reducing the data, instructions, or both read out of one or more allocated virtual queues 232 to a final result that is provided to one or more portions of a graphics pipeline, for example, a shader. In this way, arbitration engine 236 arbitrates requests 224 as they are ready to return rather than in the order in which they were issued. That is to say, arbitration engine 236 processes the requests 224 out of order. As such, processing times are reduced as a request ready to report does not need to wait for other requests to be arbitrated before it is. By deferring arbitration of return queue with partial requests until return queues not including a partial request are arbitrated, arbitration engine 236 helps prevent return queues including partial requests from causing deadlocks and causing processing delays.

According to embodiments, in response to reading out data, instructions, or both from one or more allocated virtual queues 232, queue manager 230 is configured to update the virtual queues to reflect the reading out. For example, queue manager 230 is configured to update a read pointer in one or more queue managers 230. Further, in response to reading out data, instructions, or both from one or more allocated virtual queues 232, queue manager 230 is configured to update the return queues 228 to which the virtual queues 232 are allocated to reflect the reading out. For example, queue manager 230 is configured to update identification information of the virtual queues 232 reading out data into the return queue 228. In response to a virtual queue 232 indicating that all the data stored in the virtual queue has been read out (i.e., the virtual queue is empty), queue manager 230 is configured to release the virtual queue so that it is allocatable to one or more other return queues 228. Once the virtual queue 232 is released, queue manager 230 updates the return queue 228 to reflect the release of the virtual queue 232. For example, queue manager 230 removes data identifying the virtual queue 232 (e.g., unique identifier, pointer, address) from the return queue 228. In embodiments, as all the data, instructions, or both associated with one or more requests 224 or both mapped to a return queue 228 is read out of the allocated virtual queues 232, queue manager 230 is configured to update the return queue 228. For example, queue manager 230 decreases a request counter to reflect that a request, partial request, or both have been completed. According to embodiments, in response to no requests 224 being mapped to a return queue 228 (e.g., the request counter reads zero), queue manager 230 releases the return queue 228.

Figure 3:
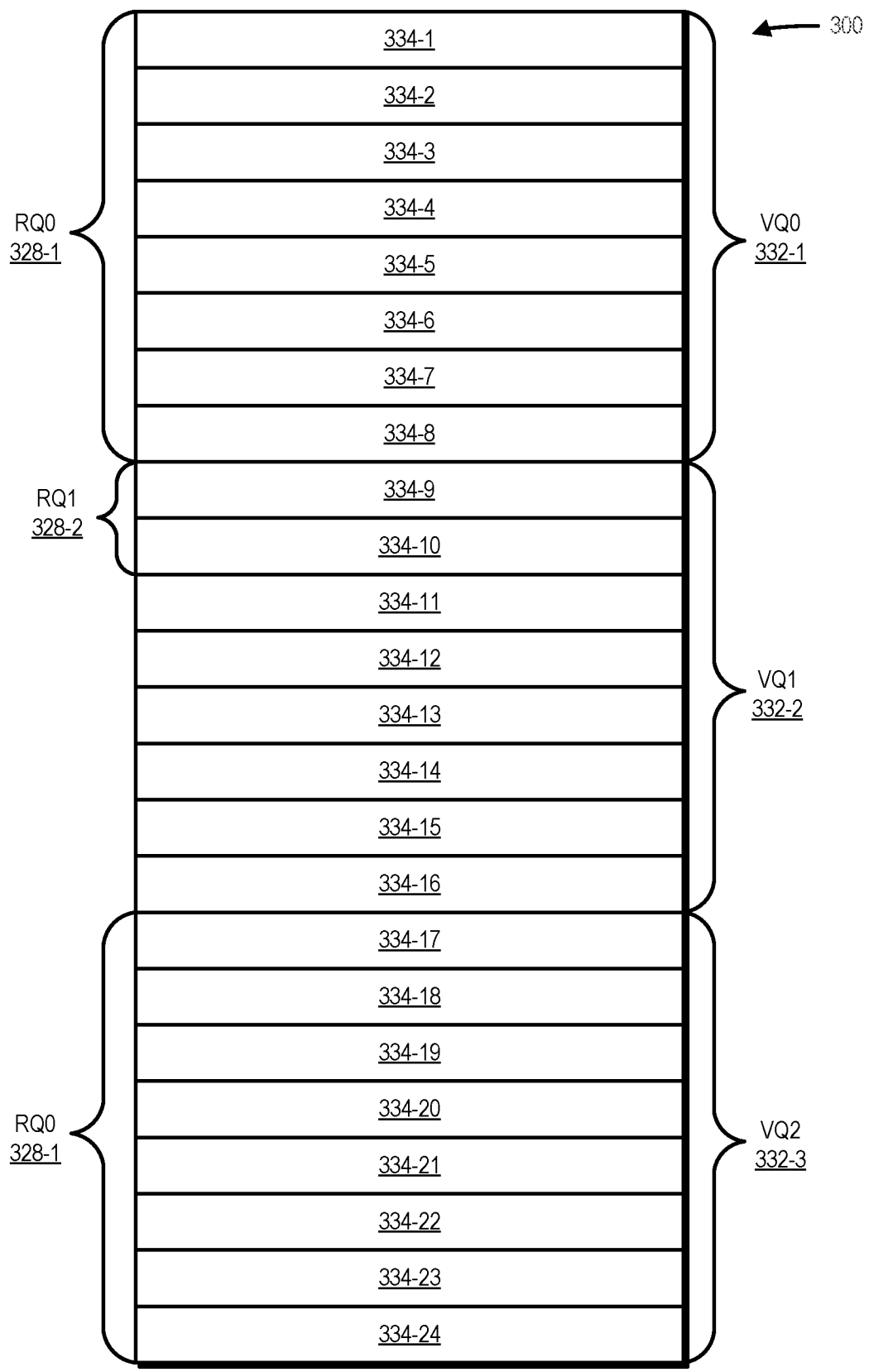
FIGS. 3 and 4 are block diagrams together presenting of an example implementation of a memory implementing a plurality of virtual queues, in accordance with an example embodiment.
Figure 4:
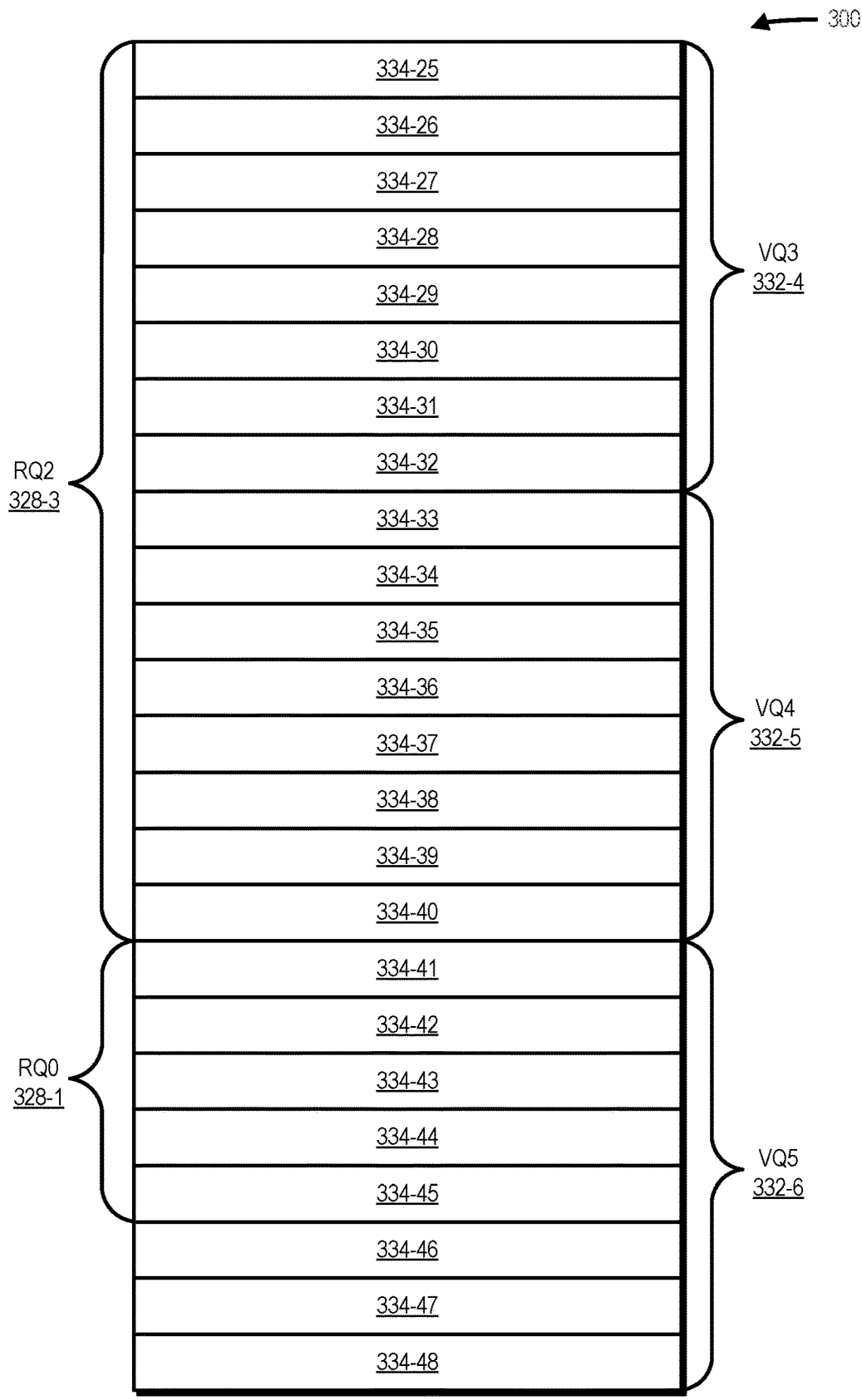

Referring now to FIGS. 3 and 4, block diagrams together illustrating an example memory 300 implementing a plurality of virtual queues is presented. Memory 300, similar to or the same as memory 106, 206, includes one or more blocks 334 each having a size, for example, in bits, bytes, or both. In some embodiments, the size of each block 334 is equal. Though the example embodiment illustrated in FIGS. 3 and 4 presents memory 300 including 48 blocks (334-1 to 334-48), in other embodiments, memory 300 may have any number of blocks. According to embodiments, memory 300 implements one or more virtual queues 332, similar to or the same as virtual queues 232, that each includes one or more contiguous blocks 334 of memory 300. For example, in the example embodiment illustrated in FIGS. 3 and 4, a first virtual queue VQ0 232-1 includes eight contiguous blocks 334-1, 334-2, 334-3, 334-4, 334-5, 334-6, 334-7, 334-8 of memory 300. In some embodiments, each virtual queue 332 includes an equal number of blocks 334 of memory 300 while in other embodiments one or more virtual queues 332 include a differing number of blocks 334 of memory 300. Though the example embodiment illustrated in FIGS. 3 and 4 presents memory 300 implementing six virtual queues (VQ0 332-1, VQ1 332-2, VQ2 332-3, VQ3 332-4, VQ4 332-5, VQ5 332-6) each including eight contiguous blocks 334 of memory 300, in other embodiments, memory 300 may implement any number of virtual queues 232 each having a respective number of blocks 334 of memory 300.

According to embodiments, one or more virtual queues 332 of memory 300 are allocated to one or more return queues 328, similar to or the same as return queues 228. For example, in response to one or more requests, similar to or the same as requests 224, being mapped to a return queue 328, a queue manager, similar to or the same as queue manager 230, allocates one or more virtual queues 332 to the return queue 328. In embodiments, the virtual queues 332 allocated to a return queue 328 include two or contiguous virtual queues 332, two or more noncontiguous virtual queues 332, or both. That is to say, the virtual queues 332 allocated to a return queue 328 include virtual queues 332 sharing a border within the layout of memory 300, virtual queues 332 not sharing a border within the layout of memory 300, or both. For example, the example embodiment illustrated in FIGS. 3 and 4 presents three noncontiguous virtual queues VQ0 332-1, VQ2 332-3, and VQ5 332-6 allocated to a first return queue RQ0 328-1. Additionally, the example embodiment illustrated in FIGS. 3 and 4 presents two contiguous virtual queues VQ3 332-4 and VQ4 332-5 allocated to a second return queue RQ2 328-3. Though the example embodiment illustrated in FIGS. 3 and 4 presents six virtual queues (VQ0 332-1, VQ1 332-2, VQ2 332-3, VQ3 332-4, VQ4 332-5, VQ5 332-6) respectively allocated to three return queues (RQ0 328-1, RQ1 328-2, RQ2 328-3), in other embodiments, any number of virtual queues may be assigned to any number of return queues.

In embodiments, to link virtual queues 332 allocated to the same return queue 328, the queue manager stores the identification information (e.g., unique identifier, pointer, address) of a next virtual queue in a virtual queue 332. That is to say, the queue manager stores the identification information of the next subsequent virtual queue allocated to the same return queue in a virtual queue 332. For example, in the example embodiment illustrated in FIGS. 3 and 4, the queue manager stores the identification information of VQ2 332-2 in VQ0 332-0 and the identification information of VQ5 332-2 in VQ2 332-2. As another example, in the example embodiment illustrated in FIGS. 3 and 4, the queue manager stores the identification information of VQ4 332-5 in VQ3 332-4. In this way, the virtual queues 332 are linked together so that they can retrieve and return data (e.g., tags, addresses), instructions, or both for the associated return queue 328.

After being allocated a virtual queue 332, one or more blocks 334 of the virtual queue 332 are allocated to retrieve data, instructions, or both indicated by the requests mapped to the return queue 328. In some embodiments, each block of a virtual queue 332 is allocated to retrieve data, instructions, or both indicated by the mapped requests while in other embodiments fewer than each block of a virtual queue 332 is allocated to retrieve data, instructions, or both indicated by the mapped requests. For example, the example embodiment illustrated in FIGS. 3 and 4 presents four virtual queues (VQ0 332-1, VQ2 332-3, VQ3 332-4, VQ4 332-5) each having every block allocated to retrieve data, instructions, or both indicated by requests mapped to respective return queues (RQ0 328-1, RQ2 328-3), one virtual queue (VQ1 332-2) having two blocks (334-9, 334-10) allocated to retrieve data, instructions, or both indicated by requests mapped to a return queue (RQ1 328-2), and one virtual queue (VQ5 332-6) having five blocks (334-41, 334-42, 334-43, 334-44, 334-45) allocated to retrieve data, instructions, or both indicated by requests mapped to a return queue (RQ0 328-1).

Referring now to FIG. 5, an example virtual queue structure 532 is presented. A virtual queue structure 532, similar to or the same as virtual queues 232, 332, includes one or more entries of data necessary for, aiding in, of helpful for the retrieval of data, instructions, or both mapped to one more return queues. In embodiments, a virtual queue structure 532 includes a valid flag 538 indicating whether or not the virtual queue structure 532, data in the virtual queue, or both are valid. For example, in response to a queue manager, similar to or the same as queue manager 230, allocating the virtual queue structure 532 to a return queue, the queue manager updates valid flag 538 to indicate that the virtual queue is valid. As another example, in response to a queue manager releasing the virtual queue structure 532 from a return queue, the queue manager updates valid flag 538 to indicate that the virtual queue is invalid. The virtual queue structure 532 further includes a write pointer 540 that includes data indicating the current entry of a virtual queue structure 532 to which data, instructions, or both will be written. In response to data, instructions, or both (e.g., cachelines) being written into an entry (e.g., blocks) of the virtual queue structure 532, the queue manager increments the write pointer 540 to indicate the next consecutive entry of the virtual queue structure 532. The virtual queue structure 532 also includes a read pointer 542 that includes data indicating the current entry of the virtual queue structure 532 from which data, instructions, or both are to be read out. For example, in response to data, instructions, or both (e.g., cachelines) being read out of an entry (e.g., block) of the virtual queue structure 532, the queue manager increases the read pointer 542 to indicate the next consecutive entry of the virtual queue structure 532. In embodiments, a difference between write pointer 540 and read pointer 542 indicates whether virtual queue structure 532 is full or empty. For example, a difference of zero between the write pointer 540 and read pointer 542 indicates that the virtual queue structure is empty. As another example, a difference between the write pointer 540 and read pointer 542 equal to the number of entries in the virtual queue structure 532 indicates the virtual queue structure 532 is full. The virtual queue structure 532 also includes a next VQ ID 544 that includes data indicating the next linked virtual queue structure 532. That is to say, data indicating the next subsequent virtual queue structure allocated to the same return queue. According to embodiments, if the virtual queue structure 532 is not linked to another virtual queue structure (e.g., the virtual queue structure is the only virtual queue structure allocated to a return queue, there is no subsequent virtual queue structure also allocated to the same return queue), next VQ ID 544 indicates there is no linked virtual queue structure.

Referring now to FIG. 6, an example return queue structure 628 is presented. The return queue structure 628, similar to or the same as return queues 228, 328, includes a valid flag 646 indicating whether or not the return queue structure is valid. For example, in response to a queue manager, similar to or the same as queue manager 230, allocating one or more virtual queues to the return queue structure 628, the queue manager updates valid flag 646 to indicate that the return queue structure 628 is valid. In embodiments, return queue structure 628 is configured to store two categories of data including a first category of data that includes data relating to one or more virtual queues, similar to virtual queues 232, 332, 532, allocated to the return queue structure 628. The first category of data includes, for example, write VQ ID 648 and read VQ ID 650. Write VQ ID 648 includes data indicating the identification information (e.g., unique IDs, pointer, addresses) of the virtual queues allocated to the return queue structure 628 that are currently having data, instructions, or both written to them. For example, virtual queues having data (e.g., tags, addresses), instructions, or both related to one or more cachelines indicated in one or more requests, partial requests, or both mapped to the return queue structure 628 (e.g., cachelines storing the requested data) written to them. Read VQ ID 650 includes data indicating the identification information (e.g., unique IDs, pointer, addresses) of the virtual queues allocated to the return queue structure 628 that are currently having data, instructions, or both read out of them. For example, virtual queues having data (e.g., tags, addresses), instructions, or both related to cachelines indicated in one or more requests, partial requests, or both mapped to the return queue structure 628 read out of them. That is to say, data (e.g., tags, addresses), instructions, or both related to the data requested by one or more requests stored in the cachelines.

The second category of data includes, for example, data relating to the arbitration of the return queue structure 628. The second category includes, for example, request counter 652, partial request tags 658, request ready to report flags 660, and arbitration enabled flag 654. Request counter 652 includes data that indicates the number of requests, sets of requests, or both mapped to the return queue structure 628. According to embodiments, in response to mapping a request, set of requests, or both, to the return queue structure 628, the request manager updates request counter 652 to reflect the number of requests, sets of requests, or both mapped to the return queue structure 628. For example, the request manager updates request counter 652 to reflect the number of sets of requests that are mapped to the return queue structure 628 and are configured to be returned together during arbitration. For each request, set of requests, or both mapped to the return queue structure 628, return queue structure 628 includes a request ID 656 that includes identification information (e.g., unique identifier, pointer, address) of a respective request or set of requests mapped to the return queue structure 628. Also, for each request, set of requests, or both mapped to the return queue structure 628, the return queue structure 628 includes a partial request tag 658 indicating if a respective request or set of requests includes a partial request (e.g., a request that is too large to be retrieved at once from a memory). For example, for a set of requests configured to return together and mapped to the return queue structure 628, the return queue structure 628 includes a tag indicating whether that set of requests includes a partial quest. For each request, set of requests, or both mapped to the return queue structure 628, return queue structure 628 further includes a ready to report flag 660 that includes data indicating if a respective request, set of requests, or both are ready for arbitration. That is to say, whether all the data (e.g., tags, addresses), instructions, or both for a respective request, set of requests, or both have been retrieved by one or more virtual queues. In embodiments, ready to report flag 660 is updated by a queue manager, similar to or the same as queue manager 230. For example, in response to all the data, instructions, or both related to a cachelines indicated in set of requests configured to return together (e.g., cachelines storing the requested data) having been written to one or more virtual queues, the queue manager updates a respective ready to report flag 660 to indicate that the set of requests is ready for arbitration. Though the example embodiment illustrated in FIG. 6 presents a return queue structure 628 having three request IDs (656-1, 656-2, 656-3), three partial requests tags (658-1, 658-2, 658-3), and three ready to report flags (660-1, 660-2, 660-3) for respective number of requests, sets of requests, or both mapped to the return queue structure 628, in other embodiments, the return queue structure 628 includes any number of request IDs 656, partial requests tags 658, and ready to report flags 660 for a respective number of requests, set of requests, or both.

The return queue structure 628 further includes an arbitration enabled flag 654 that includes data indicating whether the return queue structure is enabled for arbitration. According to embodiments, the queue manager updates the arbitration enabled flag 654 in response to one or more ready to report flags 660 indicating one or more requests, set of requests, or both are ready for arbitration. For example, in response to a ready to report flag 660 indicating a set of requests is ready for arbitration, the queue manager validates the data stored in the virtual queues and related to the set of requests and updates the arbitration enabled flag 654 based on the validation. As an example, in response to the data stored in the virtual queues and related to the set of requests being valid, the queue manager updates the arbitration enabled flag 654 to indicate that the return queue structure 628 is enabled for arbitration.

Figure 7:
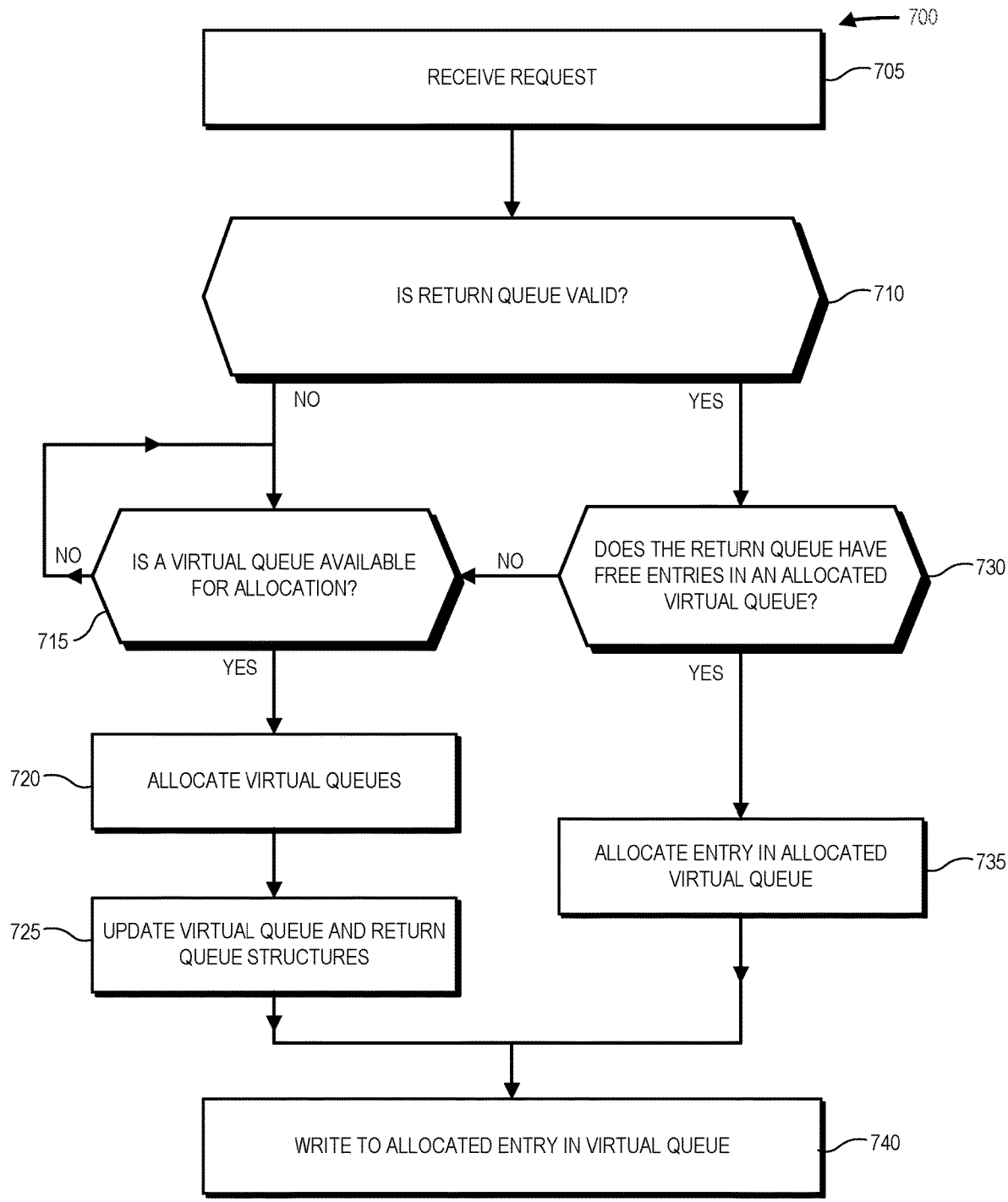
FIG. 7 is a flow diagram of an example method for allocating one or more virtual queues to a return queue, Fin accordance with an example embodiment.

Referring now to FIG. 7, a flow diagram illustrating an example method 700 for allocating one or more virtual queues to a return queue is presented. At step 705, a request manager, similar to or the same as request manager 226 receives one or more requests, similar to or the same as requests 224, and maps them to a return queue, similar to or the same as return queues 228, 328, 628. For example, the request manager maps a set of requests configured to return together to a return queue. At step 710, a queue manager, similar to or the same as queue manager 230, receives one or more return queues. For one or more received return queues, the queue manager determines if a return queue is valid (e.g., has one or more virtual queues assigned to it). To determine that a return queue is valid, the queue manager, for example, determines if a valid flag of the return queue indicates that it is valid. In response to determining that the return queue is valid, the system, similar to or the same as system 100, moves to step 730, and in response to determining that the return queue is not valid, the system moves to step 715.

At step 715, the queue manager determines if there are any virtual queues, similar to or the same as virtual queues 232, 332, 532, available for allocation. That is to say, if there are one or more virtual queues not already allocated to a return queue. For example, the queue manager determines if one or more virtual queues are available for allocation based on one or more tags (e.g., valid tags) stored in one or more virtual queues. In response to no virtual queues being available for allocation, the system repeats step 715. For example, the system waits until one or more virtual queues are available for allocation. In response to one or more virtual queues being available for allocation, the system moves to step 720. At step 720, the queue manager allocates one or more virtual queues to the return queue. For example, the queue manager allocates a number of virtual queues to the return queue necessary for returning the data, instructions, or both indicated in one or more requests, set of requests, or both mapped to the return queue. As an example, the queue manager allocates a number of virtual queues necessary for returning data in a number of cachelines indicated in a request mapped to the return queue (e.g., a number of cachelines storing the requested data). At step 725, the queue manager updates the allocated virtual queues to reflect the allocation, for example, updating one or more tags, flags, pointers, identification data, addresses, or any combination thereof of the virtual queue. For example, the queue manager updates the identification data in one or more virtual queues to link one or more virtual queues together. As another example, the queue manager updates one or more pointers, addresses, or both stored in a virtual queue to reflect the data, instructions or both indicated in one or more requests, set of requests, or both mapped to the associated return queue so that the virtual queue can retrieve at least a portion of the data, instructions or both indicated in the requests and sets of requests. Further, at step 725, the queue manager updates the return queue to reflect the allocation, for example, updating one or more tags, flags, pointers, identification data, addresses, or any combination thereof of the return queue. For example, the queue manager updates a valid tag of the return queue to indicate that it is valid. As another example, the queue manager updates the identification information (e.g., unique identifiers, pointers, addresses) of virtual queues allocated to the return queue to reflect the virtual queues newly allocated to the return queue (e.g., updating a write VQ ID 648, read VQ ID 650, or both).

Referring again to step 710, in response to determining that the return queue is valid, the system moves to step 730. At step 730, the queue manager determines if one or more virtual queues allocated to the return queue have one or more free entries (e.g., blocks). For example, the queue manager determines if one or more virtual queues have a number of free entries necessary for retrieving data, instructions, or both indicated in one or more requests, sets of requests, or both mapped to the return queue. As an example, the queue manager determines if one or more virtual queues have a number of free entries necessary for retrieving data in a number of cachelines indicated in a set of requests mapped to the return queue (e.g., a number of cachelines storing the requested data). In embodiments, the queue manager determines if a virtual queue is not full (i.e., has free entries) based on a difference between a write pointer 540 and read pointer 542. As an example, in response to a difference between a write pointer 540 and read pointer 542 being less than the number of entries of the virtual queue, the queue manager determines that the virtual queue has free entries. As another example, the queue manager determines a number of free entries of a virtual queue based on a difference between the write pointer 540 and read pointer 542 of the virtual queue. In response to one or more virtual queues allocated to the return queue having one or more free entries (e.g., a number of free entries necessary for retrieving data, instructions, or both indicated in one or more requests, sets of requests, or both mapped to the return queue) the system moves to step 735. In response to no virtual queues allocated to the return queue having free entries (e.g., a number of free entries necessary for retrieving data, instructions, or both indicated in one or more requests, sets of requests, or both mapped to the return queue), the system moves to step 715. At step 735, the available entries of the one or more virtual queues are allocated to one or more requests, sets of requests, or both mapped to the return queue. In embodiments, the queue manager updates one or more virtual queues to reflect the allocation of the one or more requests, sets of requests, or both mapped to the return queue to the entries of the virtual queues. For example, the queue manager updates the identification data in one or more virtual queues to link one or more virtual queues together. As another example, the queue manager updates one or more pointers, addresses, or both stored in a virtual queue with available entries to reflect the data, instructions or both indicated in one or more requests, set of requests, or both mapped to the return queue so that the virtual queue can retrieve at least a portion of the data, instructions or both indicated in the requests and sets of requests. Further, the queue manager updates the return queue to reflect the allocation of the requests, sets of requests, or both to the entries of the virtual queues. For example, the queue manager updates the identification information (e.g., unique identifiers, pointers, addresses) of virtual queues allocated to the return queue to reflect the allocation of the requests, sets of requests, or both to the entries of the virtual queues (e.g., updating a write VQ ID 648, read VQ ID 650, or both).

At step 740, the queue manager writes data, instructions, or both to one or more entries of the allocated virtual queues based on the requests, set of requests, or both mapped to the return queue. For example, the queue manager retrieves one or more cache lines indicated in a set of requests mapped to the return queue and writes them to one or more virtual queues allocated to the return queue. As another example, the queue manager retrieves data, instructions, or both indicated in a partial request mapped to the return queue and writes them to one or more entries of the virtual queues allocated to the return queue.

Figure 8:
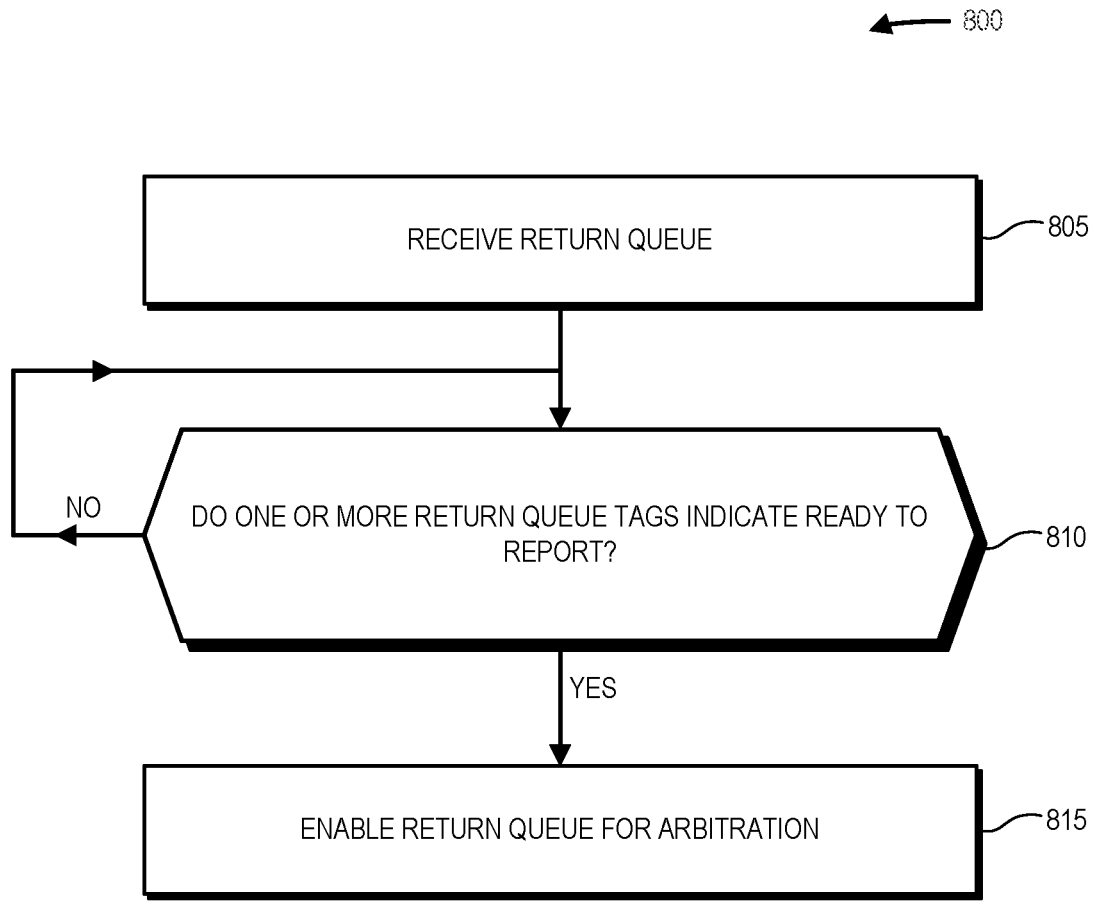
FIG. 8 is a flow diagram of an example method for enabling arbitration for one or more return queues, in accordance with an example embodiment.

Referring now to FIG. 8, a flow diagram illustrating an example method 800 for enabling arbitration for one or more return queues is presented. At step 805, an arbitration engine, similar to or the same as arbitration engine 236, receives one or more return queues, similar to or the same as return queues 228, 328, 628. At step 810, the arbitration engine determines if one or more requests, sets of requests, or both mapped to a return queue are ready to report. For example, the arbitration engine determines if the virtual queues, similar to or the same as virtual queues 232, 332, 532, allocated to a return queue have retrieved and written data (e.g., tags, addresses), instructions, or both related to the cachelines indicated in one or more requests, sets of requests, or both mapped to the return queue (e.g., cachelines storing the data requested by the requests or sets of requests). In embodiments, the arbitration engine determines if one or more requests, sets of requests, or both mapped to a return queue are ready to report based on one or more ready to report flags 660 of the return queue. For example, in response to determining the ready to report flag 660 associated with a set of requests indicates the set of requests is ready to report, the arbitration engine determines that the set of requests is ready to report. In response to determining one or more requests, sets of requests, or both mapped to a return queue are ready to report, the system, similar to or the same as system 100, moves to step 815. In response to determining no requests, sets of requests, or both mapped to a return queue are ready to report, the system repeats step 810. For example, the system waits until the arbitration engine determines that one or more requests, sets of requests, or both mapped to a return queue are ready to report. At step 815, the arbitration engine updates the return queue to reflect that it is ready to report. For example, the arbitration engine updates an arbitration enabled flag 654 to reflect that the return queue is enabled for arbitration. In embodiments, at step 815, the arbitration engine is configured to validate the data stored in one or more virtual queues allocated to the return queue. For example, the arbitration engine is configured to validate the data, instructions, or both of one or more requests, sets of requests, or both that are ready to report. In response to validating the data, the arbitration engine updates the return queue to reflect that the return queue is enabled for arbitration.

Figure 9:
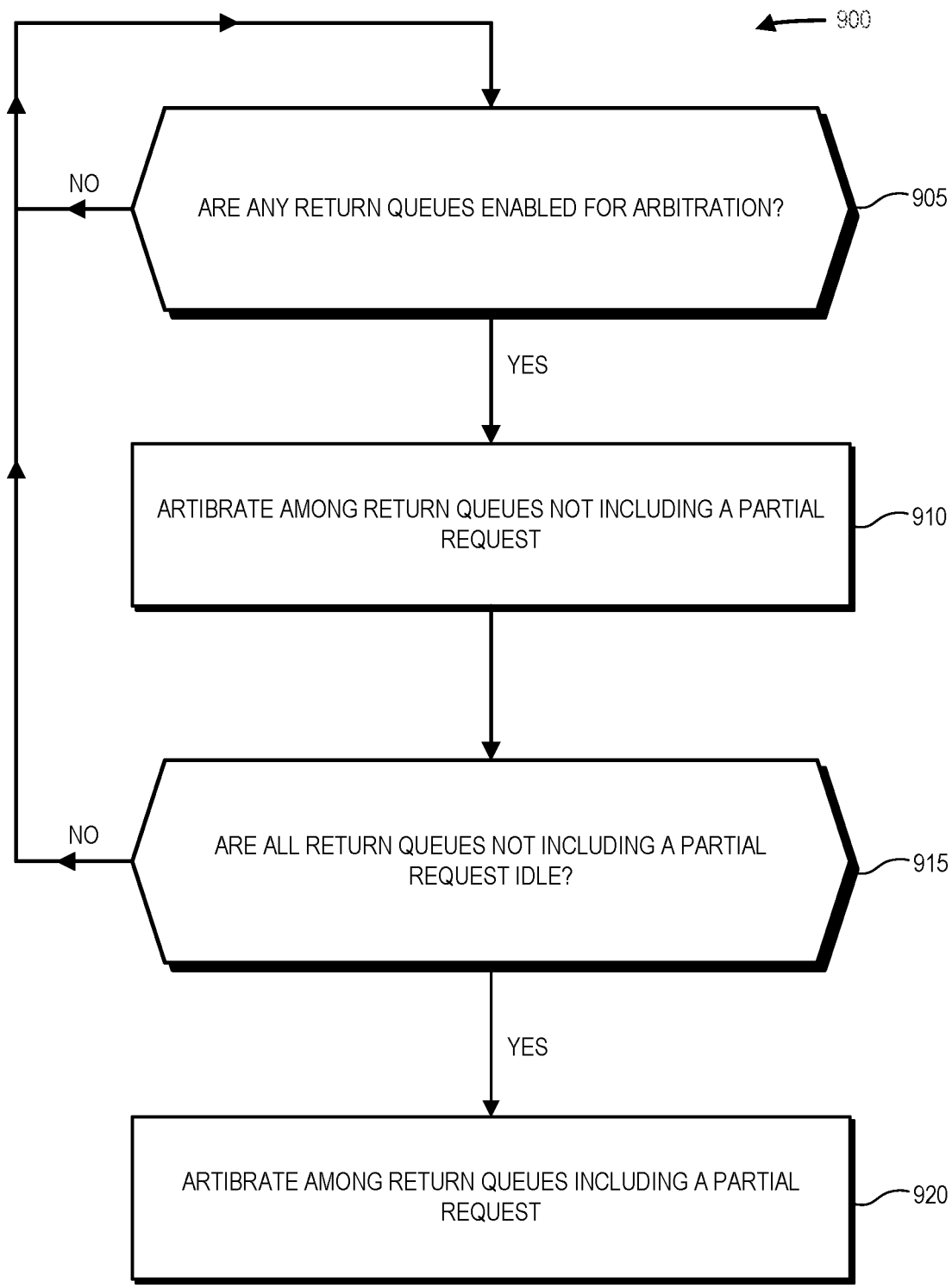
FIG. 9 is a flow diagram of an example method for arbitrating one or more return queues, in accordance with an example embodiment.

Referring now to FIG. 9, a flow diagram illustrating an example method 900 for arbitrating one or more return queues is presented. At step 905, an arbitration engine, similar to or the same as arbitration engine 236, determines if one or more return queues, similar to or the same as return queues 228, 328, 628, are enabled for arbitration. For example, the arbitration engine determines that the arbitration enabled flag 654 of one or more return queues indicates that a respective return queue is enabled for arbitration. In response to determining that no return queues are enabled for arbitration, the system, similar to or the same as system 100, repeats step 905. For example, the system waits until the arbitration engine determines one or more return queues are enabled for arbitration. In response to determining one or more return queues are enabled for arbitration, the system moves to step 910. At step 910, the arbitration engine arbitrates each return queue not including a partial request and defers the arbitration for each return queue including a partial request. For example, the arbitration defers the arbitration for each return queue including a partial request until after each return queue not including a partial request is arbitrated. In embodiments, the arbitration engine determines if a return queue includes a partial request based on one or more tags, flags, or both of the return queue. For example, in response to a partial request tag 658 of a return queue indicating a request, set of requests, or both that are ready to report includes a partial request, the arbitration engine determines that the return queue includes a partial request and defers its arbitration. According to embodiments, the arbitration engine arbitrates each return queue not including a partial request using, for example, a round robin arbitration, a weighted round robin arbitration, or both. In embodiments, arbitration includes, for example, reading out data, instructions, or both related to one or more requests that are ready to report from one or more virtual queues, similar to or the same as virtual queues 232, 332, 532, allocated to a return queue. For example, arbitration includes reading out the data (e.g., tags, addresses), instructions, or both related to the cachelines indicated in the one or more requests, set of requests, or both from the allocated virtual queues into one or more memories, queues, analog logics, digital logics, or any combination thereof configured to process to the data and instructions. According to embodiments, arbitration further includes, for example, reducing the data, instructions, or both read out of one or more virtual queues to a final result that is provided to one or more portions of a graphics pipeline, for example, a shader.

At step 915, the arbitration engine determines if each return queue not including a partial request is idle. That is to say, each return queue not including a partial request has no more requests, set of requests, or both ready to report. In embodiments, the arbitration engine determines if a return queue not including a partial request is idle based on one or more flags of the return queue. For example, in response to no ready to report flags 660 of the return queue indicating a request, set of requests, or both are ready to report, the arbitration engine determines that the return queue is idle. In response to one or more return queues not including partial requests not being idle, the system moves back to step 905. In response to each return queue not including partial requests being idle, the system moves to step 920. At step 920, one or more return queues including a partial request are arbitrated. For example, data (e.g., tags, addresses), instructions, or both related to one or more cachelines indicated a partial request stored in one or more allocated virtual queues (e.g., cachelines stored data requested by the partial request) are read into one or more memories, queues, analog logics, digital logics, or any combination thereof configured to process to the data and instructions. In this way, the potential for the partial requests to cause processing delays is reduced. For example, deferring arbitration of the return queues with partial requests until return queues not including a partial request are arbitrated helps prevent the partial requests from causing a deadlock before the return queues not including a partial request have been arbitrated.

In some embodiments, the apparatus and techniques described above are implemented in a system including one or more integrated circuit (IC) devices (also referred to as integrated circuit packages or microchips), such as the system described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or."

That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving a request to support a graphics pipeline, wherein the request is associated with a return queue comprising one or more virtual queues representing at least a portion of a memory; and
based on writing data indicated in the request to the one or more virtual queues, arbitrating the return queue by:
deferring arbitration of the return queue until one or more other return queues not including partial quests have been arbitrated based on an indication that one or more requests of the return queue is a partial request, wherein the partial request is associated with a second request indicating data from a number of cachelines and wherein the partial request requests data from a first portion of the number of cachelines and omits requesting data from at least a second portion of the number of cachelines.

2. The method of claim 1, further comprising:
mapping the request to the return queue; and
allocating a number of virtual queues to the return queue based on the request.

3. The method of claim 1, further comprising:
based on the one or more virtual queues of the return queue not having a number of free entries necessary to store data indicated in the request, allocating an additional virtual queue to the return queue.

4. The method of claim 3, further comprising:
storing identification data of the additional virtual queue in a virtual queue of the one or more virtual queues to link the additional virtual queue and the virtual queue of the one or more virtual queues.

5. The method of claim 1, further comprising:
determining that the request is ready to report,
wherein arbitrating the return queue based on the request is further in response to determining that the request is ready to report.

6. The method of claim 1, wherein the memory stores a plurality of virtual queues.

7. The method of claim 1, wherein the request comprises a vector.

8. A processing system, comprising:
a processor coupleable to a memory storing a plurality of virtual queues and configured to:
receive a request to support a graphics pipeline, wherein the request is associated with a return queue comprising one or more virtual queues of the plurality of virtual queues; and
based on writing data related to the request to the one or more virtual queues, arbitrate the return queue by:
deferring arbitration of the return queue until one or more other return queues not including partial quests have been arbitrated based on an indication that one or more requests of the return queue is a partial request, wherein the partial request is associated with a second request indicating data from a number of cachelines and wherein the partial request requests data from a first portion of the number of cachelines and omits requesting data from at least a second portion of the number of cachelines.

9. The processing system of claim 8, wherein the processor is further configured to:
determine a number of virtual queues based on the request; and
allocate the number of virtual queues to the return queue.

10. The processing system of claim 8, wherein the processor is further configured to:
based on the one or more virtual queues of the return queue not having a number of free entries necessary to store data indicated in the request, allocate an additional virtual queue of the plurality of virtual queues to the return queue.

11. The processing system of claim 10, wherein the processor is further configured to:
store identification data of the additional virtual queue in a virtual queue of the one or more virtual queues to link the additional virtual queue and the virtual queue of the one or more virtual queues.

12. The processing system of claim 10, wherein the processor is further configured to:
based on the additional virtual queue of the plurality of virtual queues being allocated to the return queue, allocate at least a portion of data indicated in the request to the additional virtual queue of the plurality of virtual queues.

13. The processing system of claim 8, wherein the processor is further configured to:
determine that the request is ready to report,
in response to determining that the request is ready to report, enable arbitration for the return queue.

14. A method, comprising:
mapping a set of requests to support a graphics pipeline to a return queue, the set of requests indicating a plurality of cachelines, wherein the return queue comprises one or more virtual queues representing at least a portion of a memory; and
in response to writing data related to the cachelines indicated in the set of requests to the one or more virtual queues, arbitrating the return queue by:
deferring arbitration of the return queue until one or more other return queues not including partial quests have been arbitrated based on an indication that one or more requests of the return queue is a partial request, wherein the partial request is associated with a second request indicating data from a number of cachelines and wherein the partial request requests data from a first portion of the number of cachelines and omits requesting data from at least a second portion of the number of cachelines.

15. The method of claim 14, wherein the memory implements a plurality of first in, firs out (FIFO) queues.

16. The method of claim 14, further comprising:
determining that the set of requests are ready to report,
wherein arbitrating the return queue is further in response to determining that the set of requests are ready to report.

\* \* \* \* \*